(12) United States Patent
Chan (10) Patent No.: US 11,836,014 B2
(45) Date of Patent: Dec. 5, 2023

(54) ELECTRONIC DEVICE

(71) Applicant: PEGATRON CORPORATION, Taipei (TW)

(72) Inventor: Chi-Meng Chan, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/862,228

(22) Filed: Jul. 11, 2022

(65) Prior Publication Data
US 2023/0063892 A1   Mar. 2, 2023

(30) Foreign Application Priority Data
Aug. 26, 2021   (TW) .................. 110210107

(51) Int. Cl.
*G06F 1/16* (2006.01)
*H01F 7/02* (2006.01)

(52) U.S. Cl.
CPC .......... *G06F 1/1681* (2013.01); *G06F 1/1616* (2013.01); *H01F 7/0205* (2013.01)

(58) Field of Classification Search
CPC ............................. G06F 1/1616; H01F 7/0205
See application file for complete search history.

(56) References Cited

U.S. PATENT DOCUMENTS

| | | | |
|---|---|---|---|
| 8,015,666 B2 * | 9/2011 | Wang ................... | G06F 1/1681 16/337 |
| 9,851,749 B2 * | 12/2017 | Morrison .............. | G06F 1/1616 |
| 9,995,070 B2 * | 6/2018 | Hamel .................. | G06F 1/1677 |
| 11,216,043 B1 * | 1/2022 | Holung ................ | G06F 1/1684 |
| 11,256,302 B2 * | 2/2022 | Holung ................ | G06F 1/1681 |
| 11,422,592 B2 * | 8/2022 | Holung ................ | G06F 1/1681 |
| 11,455,008 B2 * | 9/2022 | Holung ................ | G06F 1/1681 |
| 2003/0179880 A1 | 9/2003 | Pan et al. | |
| 2010/0058557 A1 * | 3/2010 | Wang ................... | G06F 1/1681 16/320 |
| 2015/0009614 A1 | 1/2015 | Tsai | |
| 2017/0300084 A1 * | 10/2017 | Morrison .............. | G06F 1/1681 |
| 2018/0058120 A1 * | 3/2018 | Hamel .................. | G06F 1/1681 |
| 2021/0405693 A1 * | 12/2021 | Holung ................ | G06F 1/1681 |
| 2022/0035418 A1 * | 2/2022 | Holung ................ | G06F 1/1681 |
| 2022/0037941 A1 * | 2/2022 | Holung ................ | H02K 11/30 |

* cited by examiner

*Primary Examiner* — Lisa Lea-Edmonds
(74) *Attorney, Agent, or Firm* — J.C. PATENTS (57) ABSTRACT

An electronic device includes a first body, a second body and a pivot mechanism. The second body is electrically connected to the first body. The pivot mechanism is connected between the first body and the second body and includes a shaft and a sheath rotatably sleeved on the shaft. One of the shaft and the sheath includes a first magnetic material, and the other of the shaft and the sheath includes a second magnetic material magnetically attracting the first magnetic material.

9 Claims, 9 Drawing Sheets

ELECTRONIC DEVICE

CROSS-REFERENCE TO RELATED APPLICATION

This application claims the priority benefit of Taiwan application serial no. 110210107, filed on Aug. 26, 2021. The entirety of the above-mentioned patent application is hereby incorporated by reference herein and made a part of this specification.

BACKGROUND

Technology Field

The disclosure relates to an electronic device.

Description of Related Art

Thanks to the advancement of semiconductor components and display technology, electronic devices have been developing towards trends of being compact, multi-functional, and easily portable. Common portable electronic devices include smart phones, notebook computers, and so on. The portable electronic devices adopt a folding method to reduce a storage area and to achieve the thin, lightweight, and compact electronic products. Taking a notebook computer as an example, a general notebook computer is mostly composed of a host and a display device, and the host and the display device are pivotally connected to each other. A user may fold the host and the display device of the notebook computer through relative rotation of the host and the display device to facilitate portability and may unfold the display device to facilitate operations when the notebook computer is to be used.

Generally, a pivot mechanism is disposed between the host and the display device of the notebook computer, so that the host and the display device are adapted to be unfolded or closed through the relative rotation of the pivot mechanism. In detail, in order to allow the display device to be unfolded to a desired angle with respect to the host, gears are commonly used as pivot elements of a portable electronic device in the industry. However, the mechanical components of such design are complicated, and the gears are exposed outside the casing, which greatly reduces the aesthetics of the portable electronic device.

SUMMARY

The disclosure is related to an electronic device, in which a pivot mechanism thereof is simple and is adapted to achieve a multi-stage torsion effect.

The disclosure provides an electronic device including a first body, a second body and a pivot mechanism. The second body is electrically connected to the first body. The pivot mechanism is connected between the first body and the second body and includes a shaft and a sheath rotatably sleeved on the shaft. One of the shaft and the sheath includes a first magnetic material, and the other one of the shaft and the sheath includes a second magnetic material magnetically attracting the first magnetic material.

In an embodiment of the disclosure, the shaft includes a shaft connecting member connected to one of the first body and the second body, and the sheath includes a sheath connecting member connected to the other one of the first body and the second body.

In an embodiment of the disclosure, the first magnetic material includes a permanent magnet, and the second magnetic material includes a ferromagnetic material.

In an embodiment of the disclosure, the sheath includes a sheath body and a sheath magnetic member, and the sheath magnetic member includes the first magnetic material.

In an embodiment of the disclosure, the sheath magnetic member is an annulus magnet, which is disposed around an inner surface of the sheath body.

In an embodiment of the disclosure, the number of the sheath magnetic member is plural, and each sheath magnetic member is embedded in the sheath body.

In an embodiment of the disclosure, the shaft includes a shaft body and a shaft magnetic member, and the shaft magnetic member is embedded in the shaft body.

In an embodiment of the disclosure, when the first body is in a first open state relative to the second body, the shaft magnetic member attracts one of the plurality of sheath magnetic members, and when the first body is rotated to a second open state relative to the second body, the shaft magnetic member attracts another one of the plurality of sheath magnetic members.

In an embodiment of the disclosure, the shaft includes a plurality of shaft magnetic members, and the plurality of shaft magnetic members is disposed along an axial direction of the shaft.

In an embodiment of the disclosure, the electronic device further includes a lubricating layer disposed between the sheath and the shaft.

Based on the above descriptions, the electronic device of the disclosure utilizes a magnetic attraction property as a source of torque (resistance) when the pivot mechanism rotates, so that the shaft and the sheath of the pivot mechanism individually include magnetic materials that attract each other. With such configuration, when a user exerts an external force to change a relative position of the first body and the second body (for example, rotating from a closed state to an open state), both of the shaft and the sheath may maintain a certain attraction force (a rotation torque) during the relative rotation process, and after the external force disappears, the shaft and the sheath may still be maintained in the current relative position (such as the open state) through the attraction force. Therefore, the electronic device of the disclosure may simplify the number of components of the pivot mechanism and assembling complexity.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
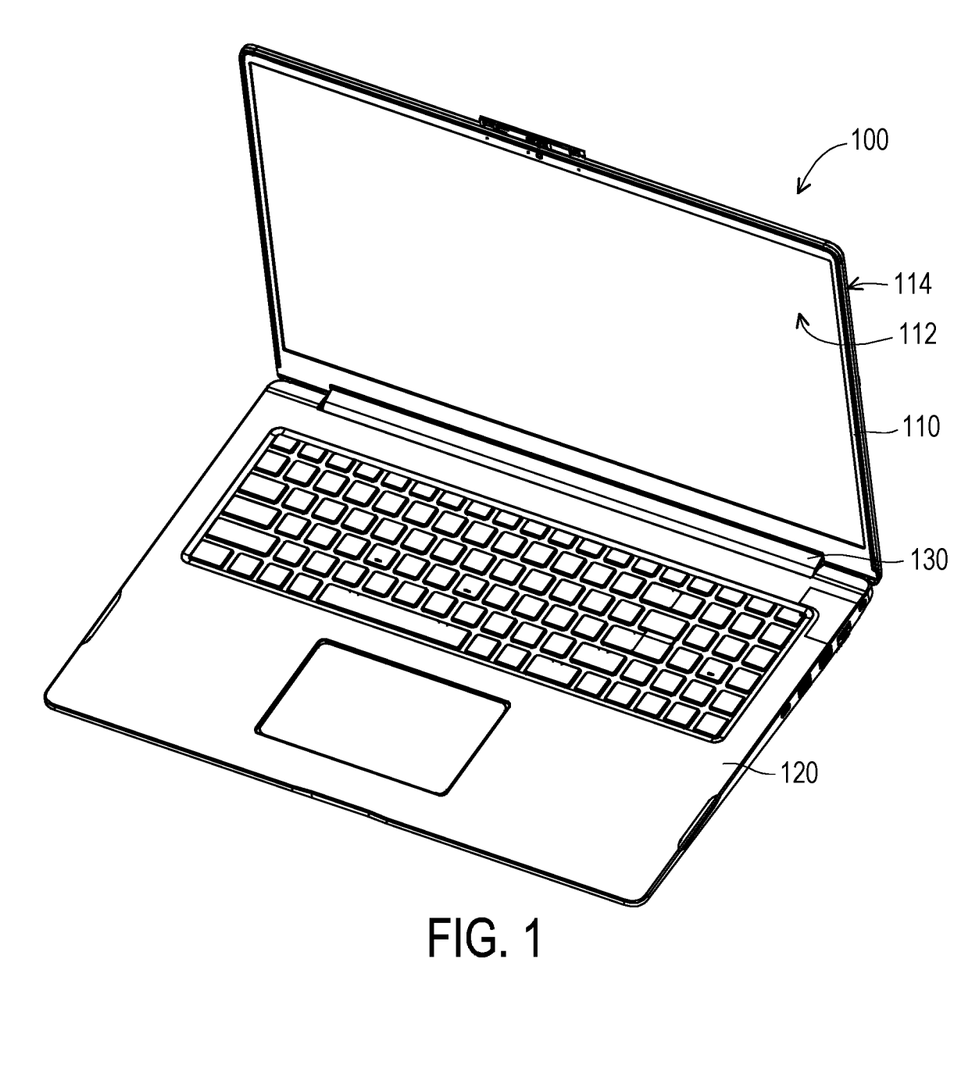
FIG. 1 is a schematic diagram of an electronic device according to an embodiment of the disclosure.
Figure 2:
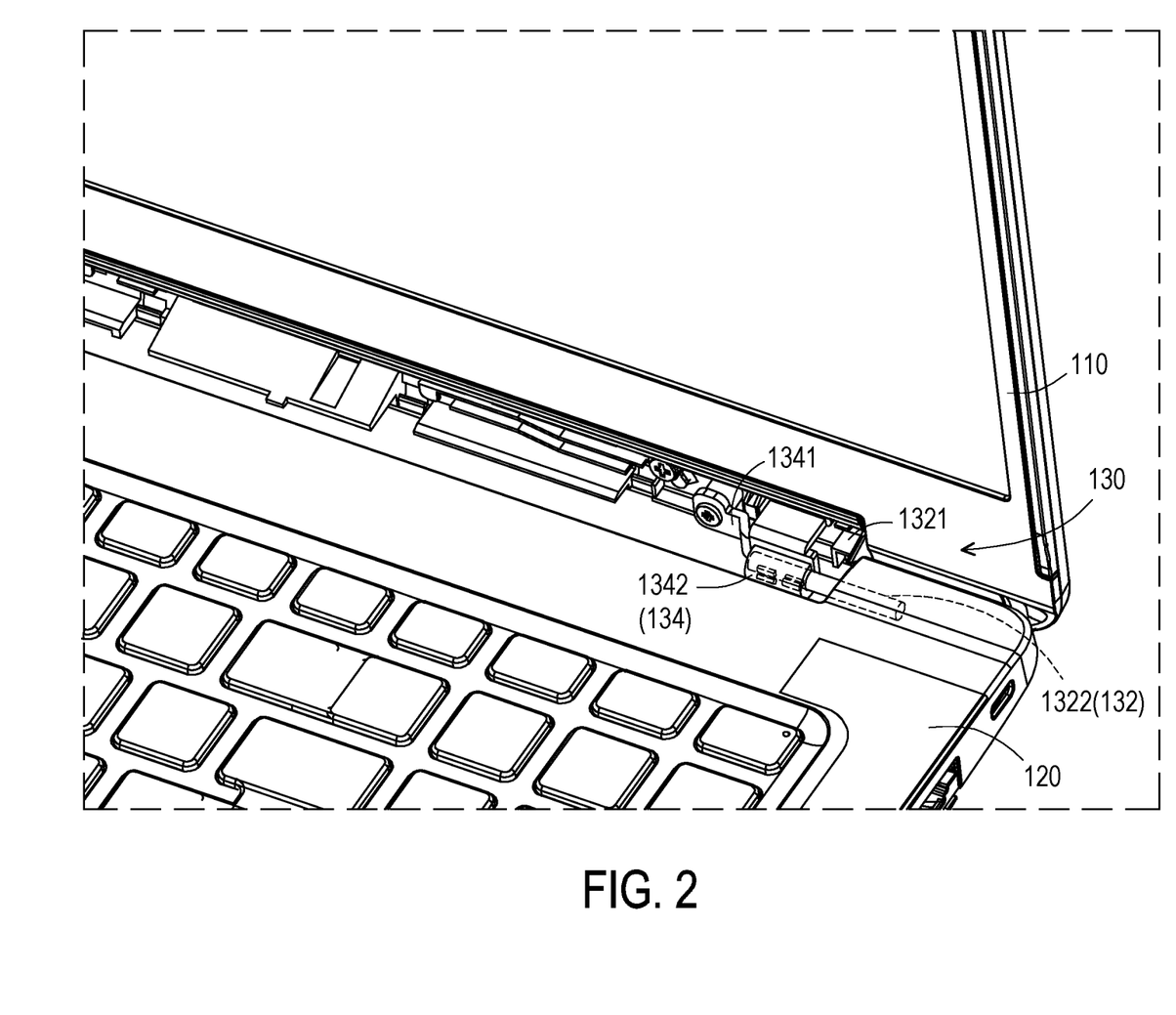
FIG. 2 is a schematic partial perspective view of an electronic device according to an embodiment of the disclosure.

FIG. 1 is a schematic diagram of an electronic device according to an embodiment of the disclosure. FIG. 2 is a schematic partial perspective view of an electronic device according to an embodiment of the disclosure. Referring to FIG. 1 and FIG. 2 together, in some embodiments, an electronic device 100 may include a first body 110, a second body 120 and a pivot mechanism 130. The first body 110 and the second body 120 are electrically connected, and the pivot mechanism 130 is pivotally connected between the first body 110 and the second body 120. For example, the electronic device 100 of the embodiment may be a portable electronic device such as a smart phone or a notebook computer. In the embodiment, the first body 110 may include an output module such as a display, etc., and the second body 120 may include an input module such as a keyboard and/or a touch panel, etc. However, the disclosure is not limited thereto, and the first body 110 and the second body 120 may have configurations the other way around or have other different configurations. In other embodiments, the first body 110 may also be a tablet PC, and the second body 120 may be a docking station for the tablet PC, so that the user may connect computer peripheral devices such as a mouse, a printer, an external hard disk, a network interface card (NIC) or a canner, etc., with the docking station to implement a long term connection, which avoids plugging and unplugging the peripheral devices of the tablet computer back and forth, and meanwhile enjoys the functionality and expandability as a desktop computer. The disclosure does not limit the type of the electronic device 100.

In some embodiments, the pivot mechanism 130 includes a shaft 132 and a sheath 134 rotatably sleeved on the shaft 132. In an embodiment, the shaft 132 may be a cylindrical shaft, and the sheath 134 may be a circular sheath that fits a shape of the cylindrical shaft, so as to be sleeved outside the shaft 132 so that the sheath 134 and the shaft 132 are adapted to be rotated relative to each other. In some embodiments, the shaft 132 may further include a shaft connecting member 1321, and the sheath 134 may further include a sheath connecting member 1341, where the shaft connecting member 1321 is connected to one of the first body 110 and the second body 120, and the sheath connecting member 1341 is connected to the other of the first body 110 and the second body 120. In an embodiment, the shaft connecting member 1321 and the sheath connecting member 1341 may be metal plate members, which may be locked to the first body 110 and the second body 120, respectively, by means of screwing, for example. In this way, the first body 110 and the second body 120 may be pivoted and rotated relative to each other through the pivot mechanism 130. For example, the sheath connecting member 1341 may be connected to the first body 110 with an output module, and the shaft connecting member 1321 may be connected to the second body 120 with an input module. Certainly, the above connection relationships may also be exchanged with each other, which is not limited by the disclosure.

In some embodiments, one of the shaft 132 and the sheath 134 includes a first magnetic material, and the other one of the shaft 132 and the sheath 134 includes a second magnetic material magnetically attracting the first magnetic material. In other words, the shaft 132 and the sleeve 134 may include respective magnetic materials magnetically attracting each other. In this way, when the shaft 132 and the sheath 134 are relatively rotated by an external force, a certain attraction force (a rotation torque) may be maintained therebetween, and after the external force disappears, the shaft 132 and the sheath 134 may still be maintained at current relative positions through the attraction force. In some embodiments, the electronic device 100 may further include a lubricating layer, which may be, for example, an oily or gel-like texture, and may be evenly coated and disposed between the sheath 134 and the shaft 132 to reduce parts-wearing and make the relative movement (rotation) between the shaft 132 and the sheath 134 smoother.

To be specific, one of the first magnetic material and the second magnetic material may be a permanent magnet, and the other of the first magnetic material and the second magnetic material may be a permanent magnet or a ferromagnetic material. For example, in an embodiment, the sheath 134 may include a permanent magnet, and the shaft 132 may be a permanent magnet or a ferromagnetic material that is attracted to the sheath 134. In the embodiment, the material of the shaft 132 may include iron, so as to be attracted to the permanent magnet of the sheath 134. Certainly, the embodiment is not limited thereto.

Figure 3:
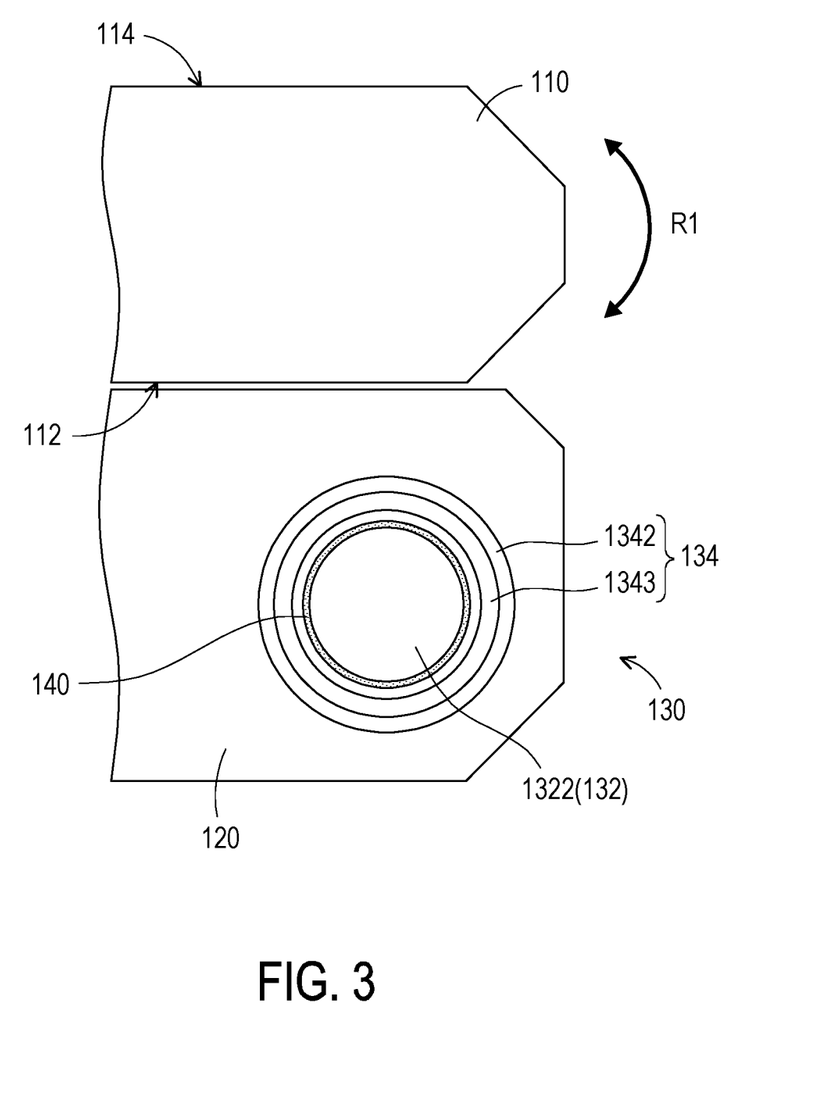
FIG. 3 is a schematic partial cross-sectional view of an electronic device in a closed state according to an embodiment of the disclosure.

FIG. 3 is a schematic partial cross-sectional view of an electronic device in a closed state according to an embodiment of the disclosure. Referring to FIG. 2 and FIG. 3 together to be specific, in some embodiments, the sheath 134 may include a sheath body 1342 and a sheath magnetic member 1343 disposed inside the sheath body 1342, where the sheath magnetic member 1343 may include the aforementioned first magnetic material. In the embodiment, the sheath magnetic member 1343 is an annulus magnet, which is disposed around an inner surface of the sheath body 1342. In other embodiments, the sheath 134 may also be a sheath-shaped permanent magnet to attract the shaft 132 of the ferromagnetic material. Certainly, in another embodiment, the sheath 134 may also be made of a ferromagnetic material such as iron, so as to be attracted to the shaft 132 that is a permanent magnet itself or is provided with a permanent magnet. In some embodiments, the electronic device 100 may further include a lubricating layer 140, which may be, for example, an oily or gel-like texture, and may be evenly coated and disposed between the sheath 134 and the shaft 132 to reduce parts-wearing and make the relative movement (rotation) between the shaft 132 and the sheath 134 smoother.

With such configuration, the user may adjust (rotate) the first body 110 and the second body 120 to an appropriate relative position based on the mutual attraction between the shaft 132 and the sheath 134 to meet different usage requirements. Specifically, in the embodiment, the first body 110 includes a first surface 112 (for example, an inner surface) and a second surface 114 (for example, an outer surface) that are relatively far away. The first body 110 is adapted to be rotated from a closed state shown in FIG. 3 (i.e., a position where the first surface 112 of the first body 110 abuts the second body 120) along a rotation direction R1 to an open position (for example, a first open position shown in FIG. 5). Therefore, the user may use an input module such as a keyboard and a touch panel of the second body 120 to input information, and view the information through an output module such as a display of the first body 110. In addition, when the user applies an external force to rotate the first body 110 and the second body 120 from the closed state to the open position, the shaft 132 and the sheath 134 may both maintain a certain attraction force (rotation torque) during the relative rotation process, and after the external force disappears, the shaft 132 and the sheath 134 may still be maintained at the current relative position (for example, the open state) through the attraction force.

Figure 4:
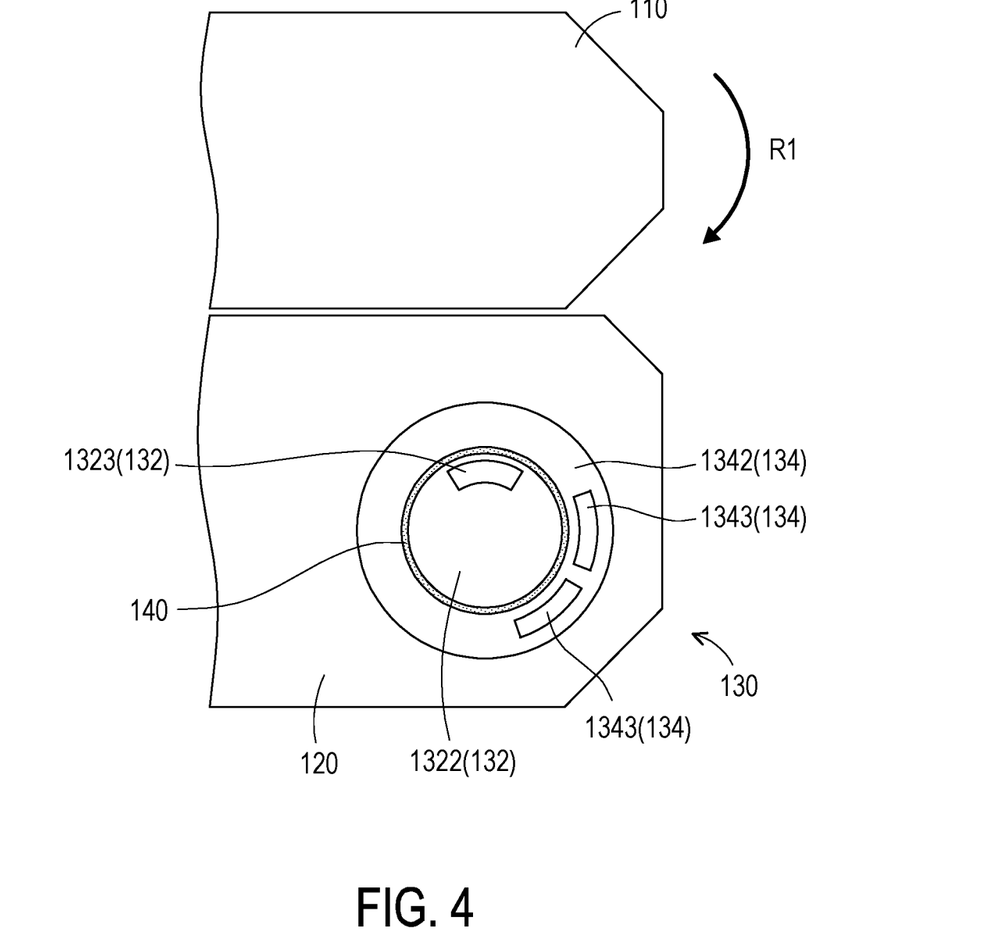
FIG. 4 is a schematic partial cross-sectional view of an electronic device in a closed state according to another embodiment of the disclosure.
Figure 5:
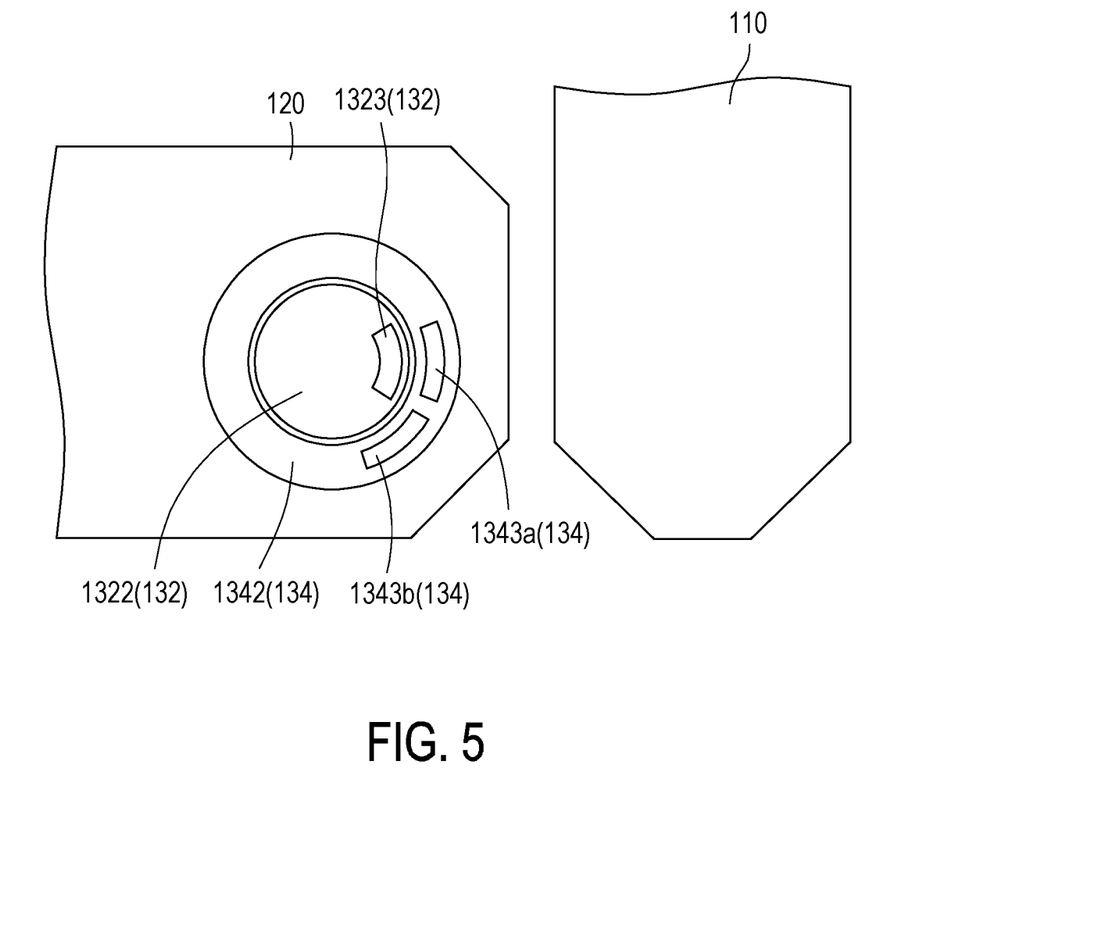
FIG. 5 is a schematic partial cross-sectional view of the electronic device of FIG. 4 in a first open state.
Figure 6:
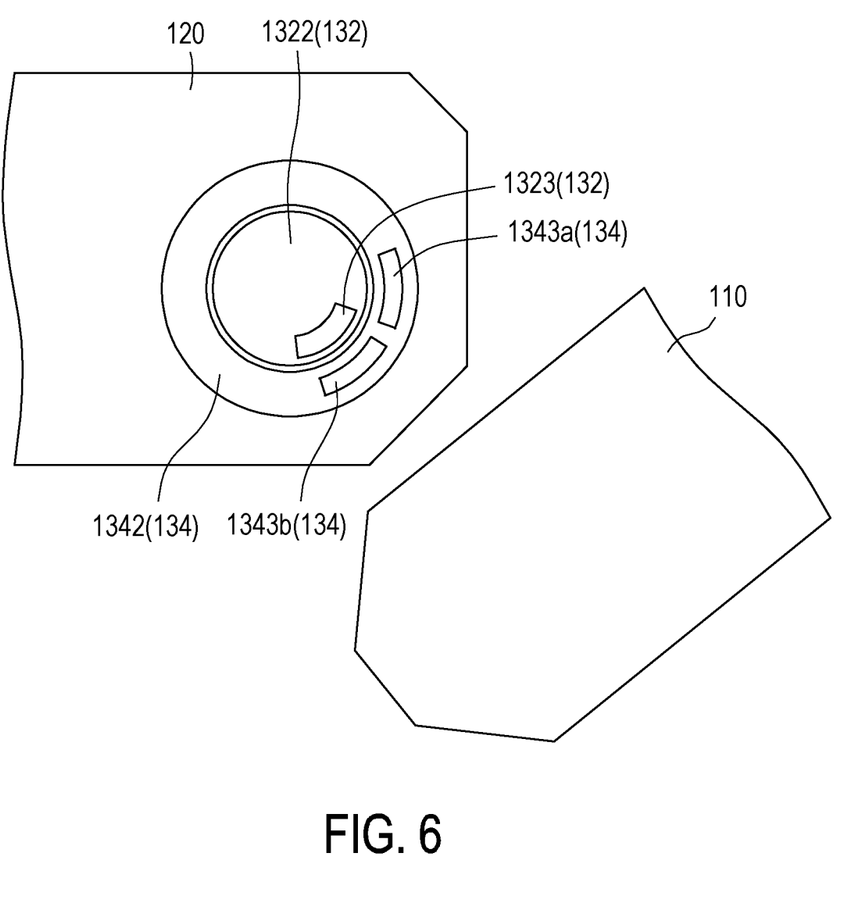
FIG. 6 is a schematic partial cross-sectional view of the electronic device of FIG. 4 in a second open state.

FIG. 4 is a schematic partial cross-sectional view of an electronic device in a closed state according to another embodiment of the disclosure. FIG. 5 is a schematic partial cross-sectional view of the electronic device of FIG. 4 in a first open state. FIG. 6 is a schematic partial cross-sectional view of the electronic device of FIG. 4 in a second open state. It should be noted that the electronic device 100 of this embodiment is similar to the electronic device 100 of the aforementioned embodiment, so that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment. The differences between the electronic device 100 of this embodiment and the electronic device 100 of the aforementioned embodiment will be described below.

Referring to FIG. 4 to FIG. 6, in some embodiments, the sheath 134 may include a sheath body 1342 and a plurality of sheath magnetic members 1343 disposed in the sheath body 1342, where the plurality of sleeve magnetic members 1343 may be embedded in the sheath body 1342. In the embodiment, the plurality of sheath magnetic members 1343 may be disposed along a circumferential direction of the sheath body 1342. The so-called "circumferential direction" means a direction around an axis of the sheath 134, which is perpendicular to the axis and perpendicular to a radius of the cross section as well. Correspondingly, the shaft 132 may include a shaft body 1322 and a shaft magnetic member 1323, and the shaft magnetic member 1323 is embedded in the shaft body 1322, where the shaft magnetic member 1323 may include the aforementioned second magnetic material to attract the first magnetic material. In the embodiment, one shaft magnetic member 1323 may correspond to a plurality of sheath magnetic members 1343 disposed along the circumferential direction of the sheath body 1342. With such configuration, when the shaft 132 rotates to different specific angles relative to the sheath 134, the shaft magnetic member 1323 of the shaft 132 is attracted by the corresponding sheath magnetic members 1343 in the sheath 134, generating a segment texture during rotation or a change of the attraction force.

To be specific, the plurality of sheath magnetic members 1343 may be configured to be attracted to the shaft magnetic member 1323 of the shaft 132 when the electronic device 100 is in the first open state as shown in FIG. 5 and the second open state as shown in FIG. 6. For example, the sheath 134 may include sheath magnetic members 1343a and 1343b disposed along the circumferential direction of the sheath body 1342. When the first body 110 rotates relative to the second body 120 to the first open state as shown in FIG. 5, the shaft magnetic member 1323 attracts the corresponding sheath magnetic element 1343a to fix a relative position between the first body 110 and the second body 120 in the first open state. When the first body 110 rotates relative to the second body 120 to the second open state as shown in FIG. 6, the shaft magnetic member 1323 attracts the corresponding sheath magnetic member 1343b to fix the relative position between the first body 110 and the second body in the second open state. In the embodiment, the first open state may be, for example, a state that the first body 110 and the second body 120 are approximately perpendicular to each other, i.e., a state that an included angle between the first body 110 and the second body 120 is approximately 90 degrees. The second open state may be, for example, a state in which the first body 110 continues to rotate relative to the second body 120 by a specific angle, i.e., a state in which the included angle between the first body 110 and the second body 120 is greater than about 90 degrees (for example, about 135 degrees). In other words, the included angle between the first body 110 and the second body 120 in the second open state is substantially larger than the included angle between the first body 110 and the second body 120 in the first open state. Certainly, the embodiments of the disclosure are not limited thereto, and those skilled in the art should understand that the number of the sheath magnetic members may be more or less, and arrangement positions of the sheath magnetic members on the sheath body 1342 may also be different, as long as a segment texture during a rotation or a change of the attraction force is generated when the shaft 132 and the sheath 134 are relatively rotated to a specific angle.

Figure 7:
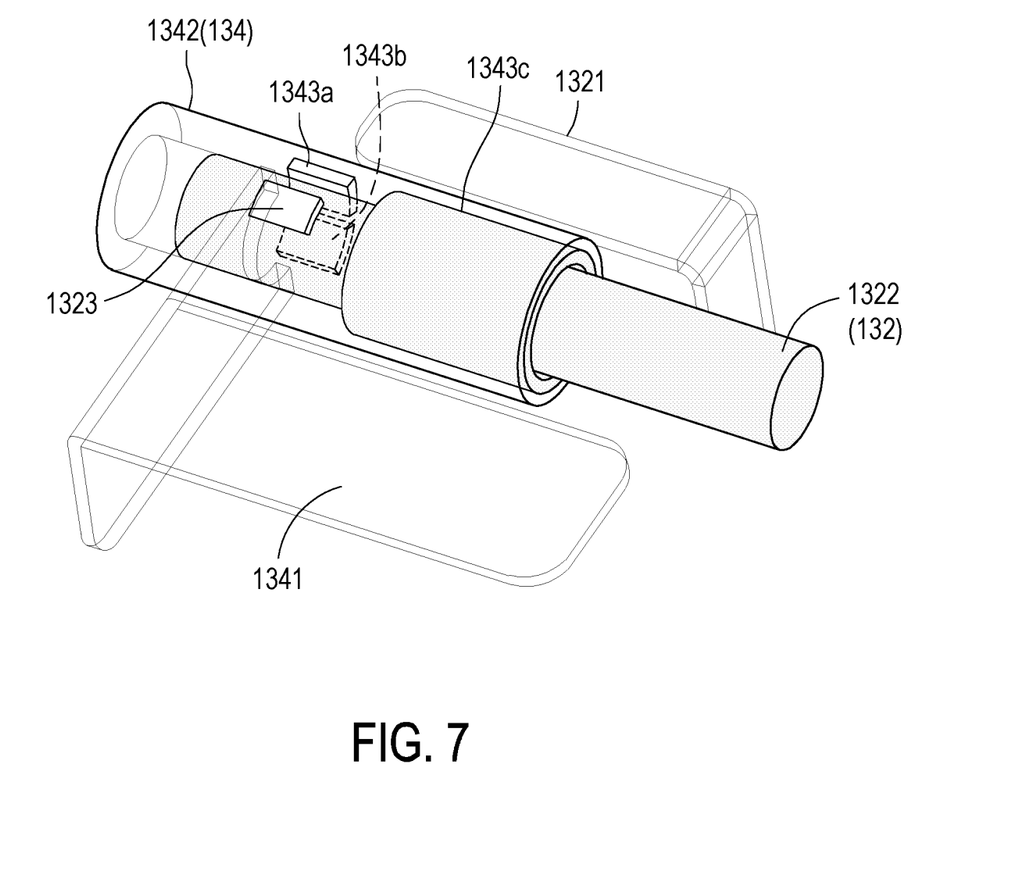
FIG. 7 is a schematic perspective view of a pivot mechanism of an electronic device according to another embodiment of the disclosure.

FIG. 7 is a schematic perspective view of a pivot mechanism of an electronic device according to another embodiment of the disclosure. It should be noted that the electronic device of the embodiment is similar to the electronic device of the aforementioned embodiment, so that reference numbers of the components and a part of contents of the aforementioned embodiment are also used in the following embodiment, where the same reference numbers denote the same or like components, and the descriptions of the same technical contents are omitted. The descriptions of the omitted parts may be referred to the aforementioned embodiment, and the detailed descriptions thereof are not repeated in the following embodiment. The differences between the electronic device of the embodiment and the electronic device of the aforementioned embodiment will be described below.

Referring to FIG. 7, in some embodiments, the sheath 134 may also include both the sheath magnetic members 1343a, 1343b disposed along the circumferential direction of the sheath body 1342 and an annulus magnet 1343c surrounding the inner surface of the sheath body 1342, so as to continuously provide a certain attraction force (rotational torque) through the annulus magnet 1343c during the relative rotation process of the shaft 132 and the sheath 134, and provide a segment texture during a rotation or a change of the attraction force through the sheath magnetic members 1343a, 1343b under specific angles (states).

Figure 8:
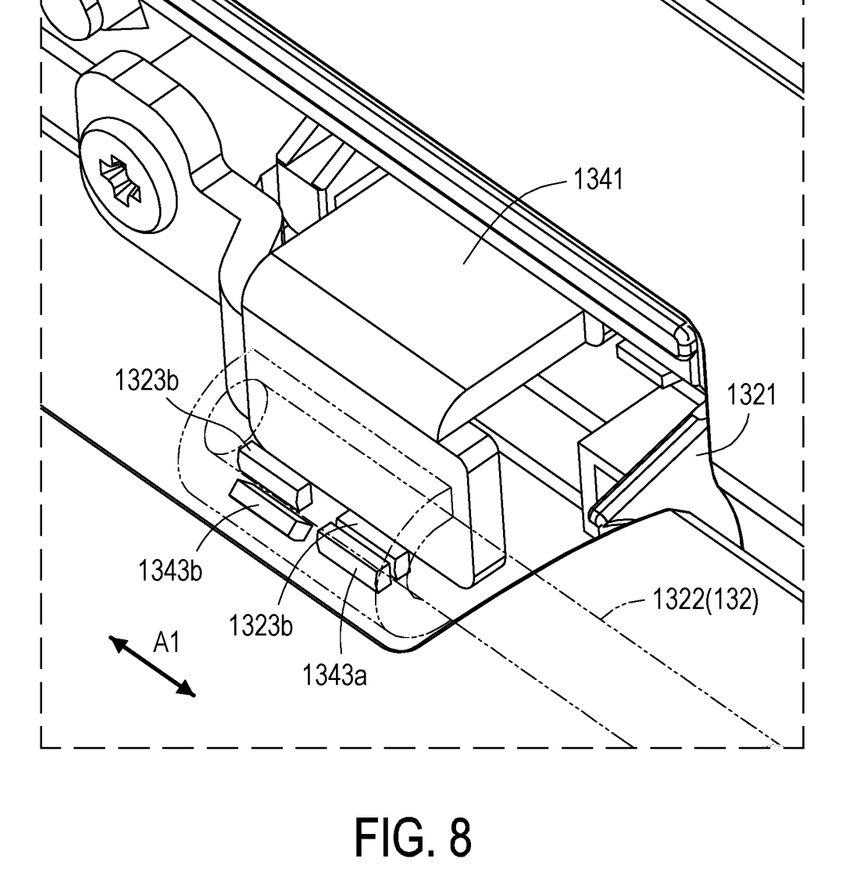
FIG. 8 is a schematic partial perspective view of an electronic device in a first open state according to still another embodiment of the disclosure.
Figure 9:
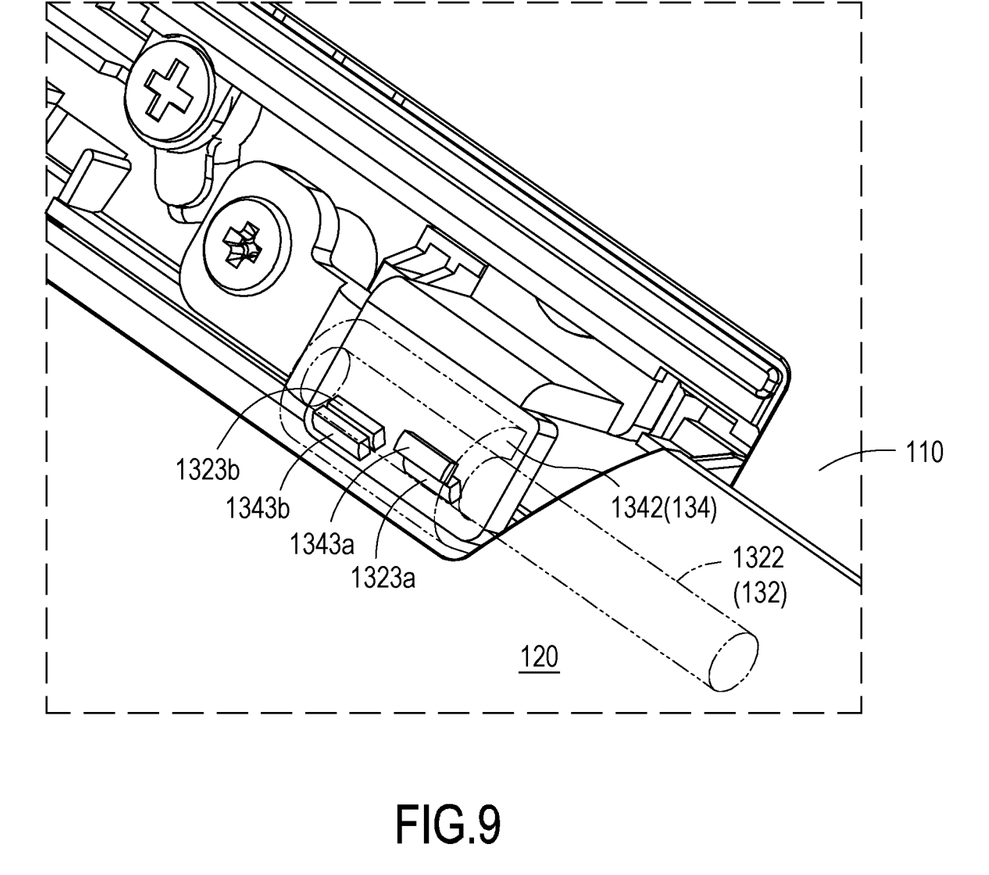
FIG. 9 is a schematic partial perspective view of the electronic device of FIG. 8 in a second open state.

FIG. 8 is a schematic partial perspective view of an electronic device in a first open state according to still another embodiment of the disclosure. FIG. 9 is a schematic partial perspective view of the electronic device of FIG. 8 in a second open state. It should be noted that the electronic device of the embodiment is similar to the electronic device of the aforementioned embodiment, so that reference numbers of the components and a part of contents of the aforementioned embodiment are also used in the following embodiment, where the same reference numbers denote the same or like components, and the descriptions of the same technical contents are omitted. The descriptions of the omitted parts may be referred to the aforementioned embodiment, and the detailed descriptions thereof are not repeated in the following embodiment. The differences between the electronic device of the embodiment and the electronic device of the aforementioned embodiment will be described below.

In some embodiments, the shaft 132 may include a plurality of shaft magnetic members 1323a, 1323b disposed along an axial direction A1 of the shaft 132 and spaced apart from each other, and the sheath 134 may include a plurality of sheath magnetic members 1343a, 1343b disposed along the axial direction A1 and spaced apart from each other. With such configuration, when the first body 110 rotates relative to the second body 120 to the first open state as shown in FIG. 8, the shaft magnetic member 1323a and the corresponding sheath magnetic member 1343a attract each other to fix the relative position between the first body 110 and the second body 120 to the first open state. When the first body 110 rotates relative to the second body 120 to the second open state as shown in FIG. 9, the shaft magnetic member 1323b attracts the corresponding sheath magnetic member 1343b to fix the relative position between the first body 110 and the second body 120 to the second open state. In other words, the shaft magnetic members 1323a and 1323b disposed along the axial direction A1 may cooperate with the corresponding sheath magnetic members 1343a and 1343b during the rotation.

In summary, the electronic device of the disclosure utilizes a magnetic attraction property as a source of torque (resistance) when the pivot mechanism rotates, so that the shaft and the sheath of the pivot mechanism include magnetic materials that attract each other. With such configuration, when a user exerts an external force to change a relative position of the first body and the second body (for example, rotating from a closed state to an open state), both of the shaft and the sheath may maintain a certain attraction force (a rotation torque) during the relative rotation process, and after the external force disappears, the shaft and the sheath may still be maintained in the current relative position (such as the open state) through the attraction force. In addition, the sheath may further include a plurality of sheath magnetic members, so as to attract the shaft magnetic members of the shaft at a plurality of relative positions to generate a segment texture during a rotation or a change of the attraction force when the shaft and the sheath are relatively rotated to a corresponding specific angle. Therefore, the electronic device of the disclosure may simplify the number of components of the pivot mechanism and assembling complexity, and may further improve a user's use feel.

What is claimed is:

1. An electronic device, comprising:
a first body;
a second body, electrically connected to the first body;
a pivot mechanism, pivotally connected between the first body and the second body and comprising a shaft and a sheath rotatably sleeved on the shaft, wherein one of the shaft and the sheath comprises a first magnetic material, and the other of the shaft and the sheath comprises a second magnetic material magnetically attracting the first magnetic material; and
a lubricating layer, disposed between the sheath and the shaft.

2. The electronic device as claimed in claim 1, wherein the shaft comprises a shaft connecting member connected to one of the first body and the second body, and the sheath comprises a sheath connecting member connected to the other one of the first body and the second body.

3. The electronic device as claimed in claim 1, wherein one of the first magnetic material and the second magnetic material comprises a permanent magnet, and the other of the first magnetic material and the second magnetic material comprises a permanent magnet or a ferromagnetic material.

4. The electronic device as claimed in claim 1, wherein the sheath comprises a sheath body and a sheath magnetic member disposed inside the sheath body, wherein the sheath magnetic member comprises the first magnetic material.

5. The electronic device as claimed in claim 4, wherein the sheath magnetic member is an annulus magnet disposed around an inner surface of the sheath body.

6. The electronic device as claimed in claim 4, wherein the number of the sheath magnetic member is plural, and each sheath magnetic member is embedded in the sheath body.

7. The electronic device as claimed in claim 6, wherein the shaft comprises a shaft body and a shaft magnetic member, the shaft magnetic member is embedded in the shaft body, and the shaft magnetic member comprises the second magnetic material.

8. The electronic device as claimed in claim 7, wherein when the first body is in a first open state relative to the second body, the shaft magnetic member attracts one of the plurality of sheath magnetic members, and when the first body is rotated to a second open state relative to the second body, the shaft magnetic member attracts another one of the plurality of sheath magnetic members.

9. The electronic device as claimed in claim 4, wherein the shaft comprises a plurality of shaft magnetic members, and the plurality of shaft magnetic members is disposed along an axial direction of the shaft.

* * * * *